United States Patent
Yang

(10) Patent No.: US 7,026,767 B2
(45) Date of Patent: Apr. 11, 2006

(54) HIGH-EFFICIENCY POWER SUPPLY APPARATUS USED WITH A DISPLAY PANEL DRIVING SYSTEM AND METHOD THEREOF

(75) Inventor: Joon-hyun Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 10/799,630

(22) Filed: Mar. 15, 2004

(65) Prior Publication Data

US 2004/0256998 A1    Dec. 23, 2004

(30) Foreign Application Priority Data

Jun. 20, 2003    (KR)    ............... 10-2003-0040098

(51) Int. Cl.
*H05B 37/00*    (2006.01)

(52) U.S. Cl. ............... 315/171; 363/125; 363/56.09; 345/60

(58) Field of Classification Search ........... 315/171; 363/125, 56.09; 345/60; 395/750.01
See application file for complete search history.

(56) References Cited

U.S. PATENT DOCUMENTS 5,960,207 A * 9/1999 Brown ............... 713/300
6,108,222 A * 8/2000 Liang ............... 363/48
6,819,011 B1 * 11/2004 Kernahan et al. ........... 307/35
2003/0099122 A1 * 5/2003 Cho ............... 363/125
2005/0018455 A1 * 1/2005 Ceruti et al. ........... 363/56.09
2005/0088376 A1 * 4/2005 Inoue et al. ............ 345/60

FOREIGN PATENT DOCUMENTS

JP    2003-61353    * 2/2003

OTHER PUBLICATIONS

. The Official Action issued by the Korean Intellectual Property Office on Feb. 25, 2005 and listing 1 reference.

* cited by examiner

Primary Examiner—Trinh V Dinh
Assistant Examiner—Binh Van Ho
(74) Attorney, Agent, or Firm—Stanzione & Kim, LLP

(57) ABSTRACT

A high-efficiency power supply apparatus used with a driving system of a display panel and a method of designing the same to improve an electrical power efficiency by providing a non-isolated direct current (DC) power directly to a display panel driving circuit comprise: a DC power supplying circuit to improve a power factor by rectifying an alternating current (AC) power and generating the non-isolated DC power, which is not isolated from the AC power, and an isolated DC power; a display panel driving circuit to generate various driving signals for driving the display panel with the non-isolated DC power; and a video signal processing circuit to perform a predetermined video signal processing for generating data to drive the display panel with the isolated DC power.

27 Claims, 4 Drawing Sheets

US 7,026,767 B2

HIGH-EFFICIENCY POWER SUPPLY APPARATUS USED WITH A DISPLAY PANEL DRIVING SYSTEM AND METHOD THEREOF

CROSS-REFERENCE TO RELATED APPLICATIONS

This application claims the priority of Korean Patent Application No. 2003-40098, filed on Jun. 20, 2003, in the Korean Intellectual Property Office, the disclosure of which is incorporated herein in its entirety by reference.

BACKGROUND OF THE INVENTION

1. Field of the Invention

The present invention relates to a power supply apparatus used with a display system and a method of designing the same, and more particularly, to a high-efficiency power supply apparatus used with a driving system of a display panel and a method of designing the same to improve a power efficiency by supplying a non-isolated direct current (DC) power from an input alternating current (AC) power directly to a display driving circuit. 2. Description of the Related Art Generally, display panels, such as plasma display panels (PDPs) or ferro electric liquid crystal (FLC) panels, are driven in a digital way.

An alternating current plasma display panel (AC PDP) is a next-generation flat panel display for displaying texts or images using plasma formed by a discharging gas. Tens to hundreds of millions of pixels are arranged in a matrix form according to a size of the AC PDP.

The AC PDP has the following advantages: wide view angle, large size, long lifespan, high contrast ratio, and super-thin shape. Common disadvantages of the AC PDP are high cost and high power consumption.

FIG. 1 shows a conventional power supply apparatus used for an AC PDP.

Referring to FIG. 1, the power supply apparatus includes an AC power source 110, a rectifier circuit 120, a power factor correction circuit 130, first and second DC-DC conversion circuits 104-1 and 140-2, and a display panel driving circuit 150.

An output voltage of the second DC-DC converting circuit 140-2 is supplied to a signal and data processing circuit, such as a video signal processing circuit, and a microprocessor.

The circuit of the power supply apparatus in the conventional AC PDP is configured in a serially connected 2-stage configuration (hereinafter, referred to as a two-stage configuration) such that a DC output voltage of the power factor correction circuit 130 is supplied as an input voltage to the first and second DC-DC conversion circuits 140-1 and 140-2, and output voltages of the first and second DC-DC conversion circuits 140-1 and 140-2 are supplied to various loads.

The power supplied to the display panel driving circuit 150 is configured in the two-stage serial connection to improve the power factor and to regulate an output voltage. However, an independent DC-DC conversion circuit of a 2-TR forward or a half-bridge type should be used for the display panel driving circuit 150. The display panel driving circuit 150 uses 75% of an entire output power of the system.

However, when the power for the display panel driving circuit 150 is configured in the two-stage serial connection, the size of a plasma display panel (PDP) increases, and power efficiency is lowered since power conversion is performed twice. For example, if the efficiency of the power factor correction circuit 130 is 95% and the efficiency of the first DC-DC conversion circuit 140-1 is 95%, the efficiency of the display panel driving circuit 150 is lowered to 90%.

SUMMARY OF THE INVENTION

Accordingly, it is an aspect of the present invention to provide a power supply apparatus used with a driving system of a display panel and a method of designing the same to minimize lost of power by supplying a non-isolated direct current (DC) power from an alternating current (AC) power directly to a display panel driving circuit without passing through a DC-DC converting circuit.

Additional aspects and/or advantages of the invention will be set forth in part in the description which follows and, in part, will be obvious from the description, or may be learned by practice of the invention.

In order to achieve the foregoing and/or other aspects of the present invention, there is provided a high-efficiency power supply apparatus used with a display panel driving system, comprising: a direct current (DC) power supplying circuit to improve a power factor by rectifying alternating current power and generating a DC power, which is not isolated from the alternating current power, and an isolated DC power, which is isolated from the alternating current power; a display panel driving circuit to generate various driving signals to drive the display panel with the non-isolated DC power; and a video signal processing circuit to perform a predetermined video signal processing to generate data used to drive the display panel with the isolated DC power.

In order to achieve the foregoing and/or other aspects of the present invention, there is also provided a method of designing a high-efficiency power supply apparatus in a display panel driving system, the method comprising: providing a non-isolated DC power, which is not isolated from an input alternating current (AC) power, directly to a display panel driving circuit; providing an isolated DC power, which is isolated from the input AC power, to a video signal processing circuit which performs a predetermined video signal process to generate data used to drive a display panel; and isolating the display panel driving circuit and the video signal processing circuit.

BRIEF DESCRIPTION OF THE DRAWINGS

The above and/or other aspects, features and advantages of the present invention will become more apparent by describing in detail exemplary embodiments thereof with reference to the attached drawings in which.

DETAILED DESCRIPTION OF THE PREFERRED EMBODIMENTS

Figure 1:
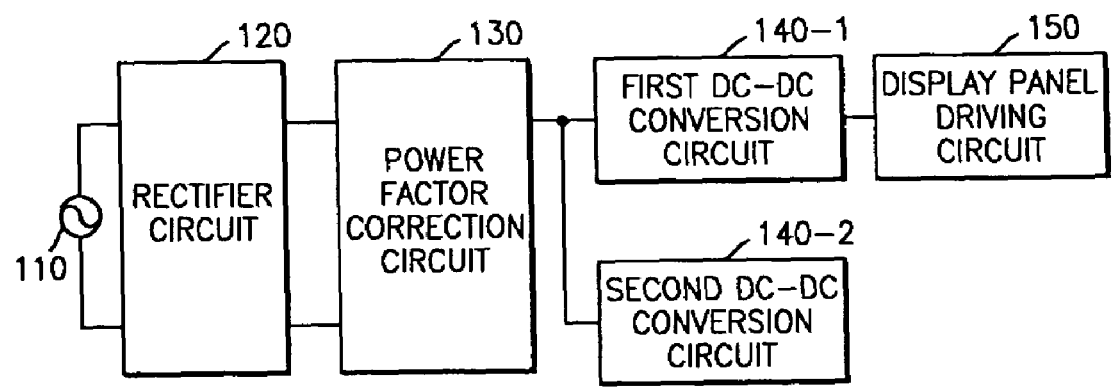
FIG. 1 is a block diagram showing a conventional power supply apparatus used for an alternating current plasma display panel (AC PDP)

Reference will now be made in detail to the embodiments of the present invention, examples of which are illustrated in the accompanying drawings, wherein like reference numerals refer to the like elements throughout. The embodiments are described below in order to explain the present invention by referring to the figures.

A high-efficiency power supply apparatus used with a driving system of a display panel uses a non-isolated output voltage of a power factor correction circuit as a power supplied to the display panel driving circuit. That is, the non-isolated output voltage of the power factor correction circuit is directly supplied to the display panel driving circuit without passing through a direction current (DC)-DC conversion circuit to improve power efficiency.

Especially, a sustain driving circuit consumes about 75% of an entire power in the plasma display panel driving system. Therefore, when the present invention is applied to thesustain driving circuit, the power efficiency can increase.

However, in order to supply the output voltage of the non-isolated power factor correction circuit directly to the display panel driving circuit without passing through the DC-DC conversion circuit, the following items should be considered.

First, the voltage outputted from the power factor correction circuit and the voltage used in the display panel driving circuit should have the same value.

Second, since the output voltage of the power factor correction circuit includes lower frequency ripple voltage twice as much as the alternating current (AC) power frequency, the power factor correction circuit does not have good regulation features.

Third, since the output voltage of the power factor correction circuit, that is, the DC-DC converter is not isolated from the used AC power, an electrical isolation between the display panel and the driving circuit should be properly solved to satisfy an electricity safety standard.

The present invention that solves the above problems will be described with reference to the accompanying figures.

Figure 2:
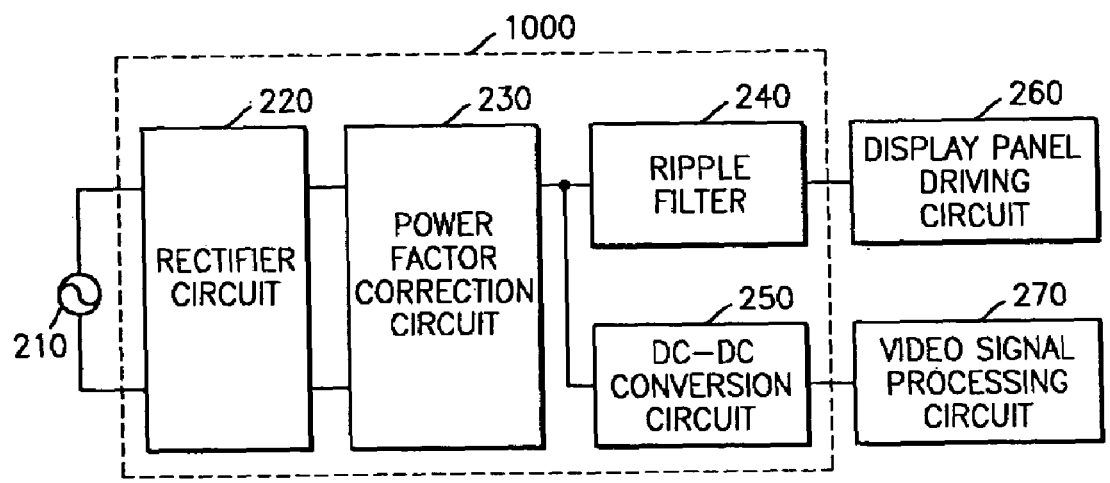
FIG. 2 is a block diagram showing a high-efficiency power supply apparatus used with a display panel driving system, according to an embodiment of the present invention.

As shown in FIG. 2, the power supply apparatus for the display panel driving system, according to the present invention, includes an AC power 210, a rectifier circuit 220, a power factor correction circuit 230, a ripple filter 240, a DC-DC conversion circuit 250, a display panel driving circuit 260, and a video signal processing circuit 270.

The rectifier circuit 220, the power factor correction circuit 230, the ripple filter 240, and the DC-DC conversion circuit 250 are referred to as a DC power supplying circuit 1000.

The video signal processing circuit 270 processes an input broadcasting signal or a video signal to generate data used to drive the display panel, and an isolated DC power output from the DC-DC conversion circuit 250 is used as a driving power of the video signal processing circuit 270.

Figure 3:
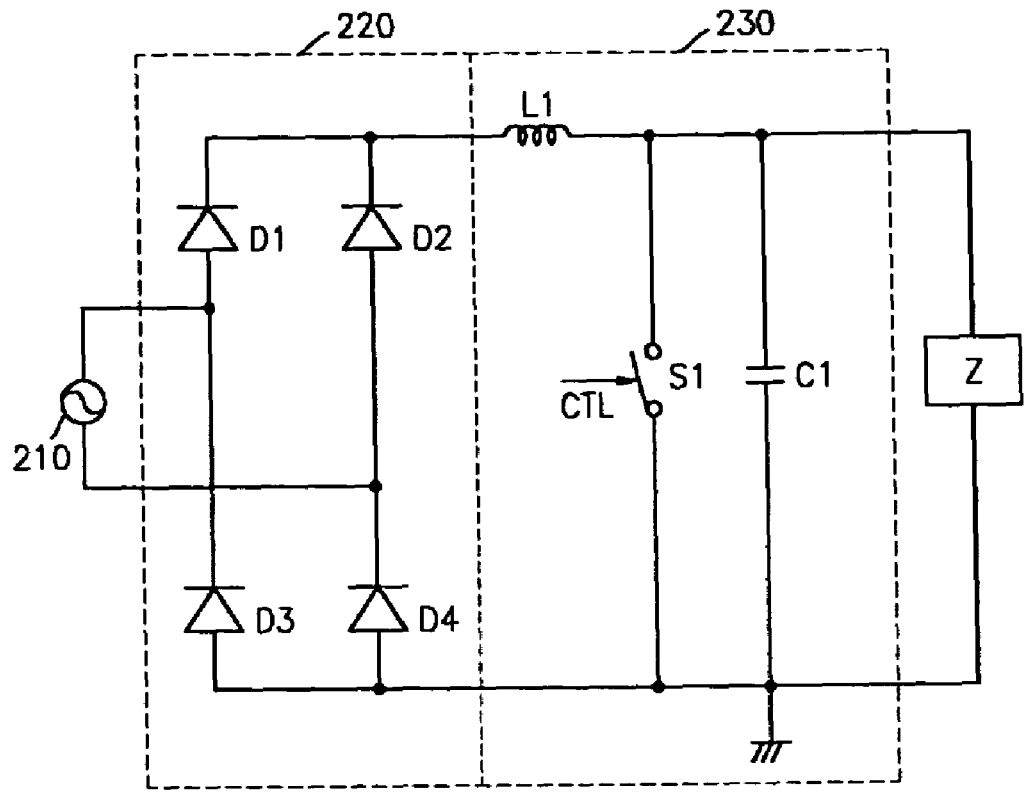
FIG. 3 is a detailed block diagram showing a rectifier circuit and a power factor correction circuit of the power supply apparatus shown in FIG. 2.

Detailed circuit configurations of the rectifier circuit 220 and the power factor correction circuit 230 are shown in FIG. 3.

Referring to FIGS. 2 and 3, the rectifier circuit 220 rectifies an input from an AC power 210 using a bridge diode circuit configuration having diodes D1-D4, and outputs a DC voltage according to the rectified input.

Then, the power factor correction circuit 230 receives the DC voltage, improves a power factor using a pulse width modulation (PWM) controlling signal, and outputs an output voltage into a capacitor C1 according to the improved power factor. After that, the voltage charged in the capacitor C1 is discharged and supplied to a load (Z), such as the display panel driving circuit 260 or the video signal processing circuit 270, as a stabilized DC voltage.

That is, in a high state section of the PWM controlling signal (CTL), a switch S1 is turned on, a magnetic energy is charged in an inductor L1, and the energy charged in the capacitor C1 is transferred to the load (Z).

In addition, in a low state section of the PWM controlling signal, the switch S1 is turned off and the magnetic energy charged in the inductor L1 is transferred to the capacitor Cl and charged therein.

The power factor is improved through the above charging/discharging processes by the PWM controlling signal.

The voltage output from the power factor correction circuit 230 and the voltage used in the display panel driving circuit should have the same value.

Therefore, the voltage output from the power factor correction circuit 230 and the voltage used in the display panel driving circuit 260 are equalized by changing the display panel driving voltage.

That is, as an example, the output voltage of the power factor correction circuit 230 applied to the plasma display system is designed to be about 360~400V DC generally, and a sustain driving voltage of the sustain driving circuit is designed to be about 160V.

Accordingly, in the present invention, the output voltage of the power factor correction circuit 230 should be lowered, or the sustain driving voltage should be increased.

Figure 4:
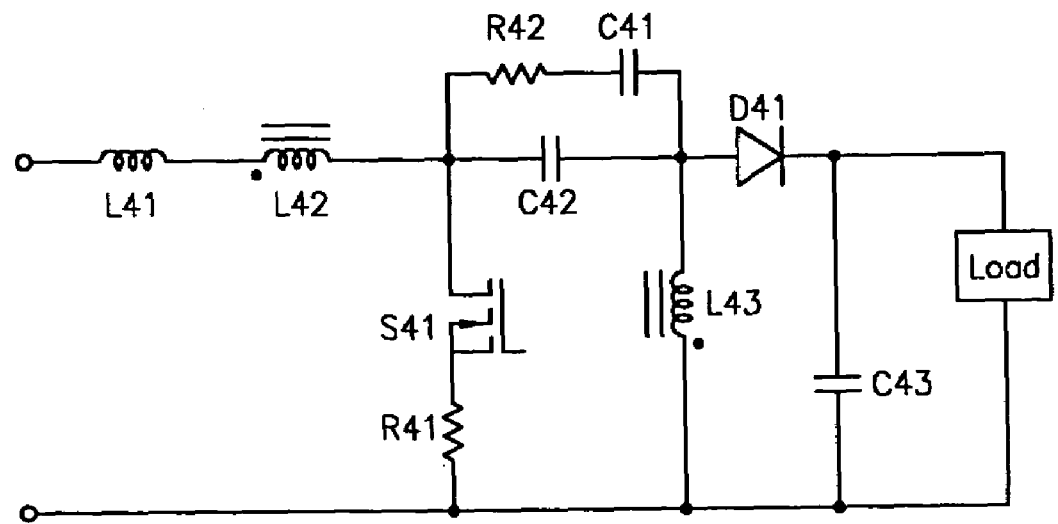
FIG. 4 is a detailed block diagram showing the rectifier circuit of the power supply apparatus shown in FIG. 2.

In order to lower the output voltage of the power factor correction circuit 230, a single ended primary inductance converter (SEPIC) including a converter controlling a level of the output voltage shown in FIG. 4 can be applied. The SEPIC includes inductors L41, L42, and L43, a transistor S41, resistors R41 and R42, capacitors C41, C42, and C43, and a diode D41. That is, the output voltage can be lowered using a secondary winding, such as the inductor L42 or L43, in the power factor correction circuit 230. Also, the sustain driving voltage can be increased by changing the sustain driving circuit.

The low frequency ripple voltage and the regulation feature of the ripple filter 240 of the power supply apparatus can be improved in the following ways.

The low frequency ripple and the regulation features can be improved by increasing the capacity of the output capacitor C1 of the power factor correction circuit 230 shown in FIG. 3.

Figure 5:
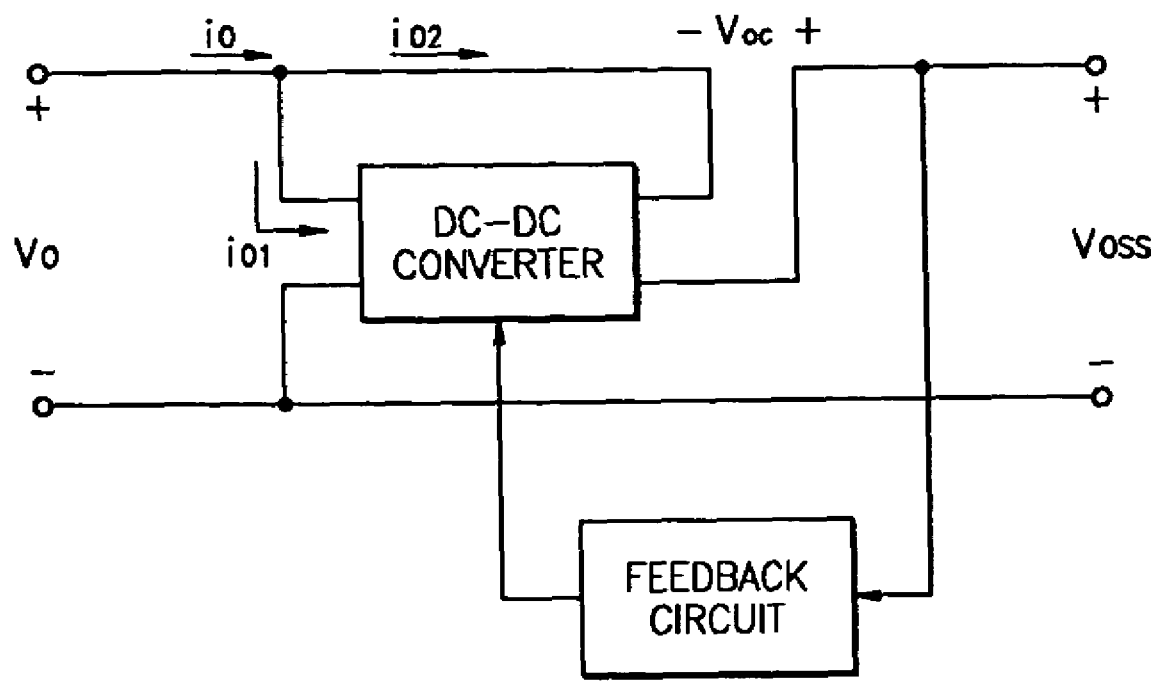
FIG. 5 is a detailed block diagram showing a ripple filter of the power supply apparatus shown in FIG. 2.

Also, the ripple filter 240 is inserted between the power factor correction circuit 230 and the display panel driving circuit 260 for more improved functions. FIG. 5 shows an example of the ripple filter 240.

The output electrical power of the power factor correction circuit 230 shown in FIG. 5 is $P_0 = v_0 i_0$, and it is divided into two parts. That is, $P_{01} = v_0 i_0$ is converted into $P_{02} = v_0 i_{02}$ with efficiency $\eta_c$. Therefore, a final output electrical power of a serial type ripple filter is $P_{oss} = V_{oss} i_{02} = v_{oc} i_{o2} + v_o i_{o2}$. Here, if $v_{oc} i_{o2} = v_0 i_{01} \cdot \eta_C$, it is the output electrical power of the DC-DC converter used in the serial type switching ripple filter, and an actual change of the electrical power is only generated on the above DC-DC converter. When it is assumed that the serial type switching ripple filter circuit is in one electrical power conversion stage, an entire efficiency $\eta_{ss}$ can be calculated using the following equation 1.

$$\eta_{SS} = \frac{1 + \frac{v_{oC}}{v_0}}{1 + \frac{v_{0C}}{\frac{v_0}{\eta_C}}} \quad (1)$$

Therefore, in order to obtain high efficiency, the efficiency $\eta_C$ of the DC-DC converter should increase, and a ratio of the voltage converted into the electric power for the output voltage of the power factor correction circuit 230 should decrease.

The electric isolation between the display panel and the driving circuit can be solved in the following ways.

Figure 6:
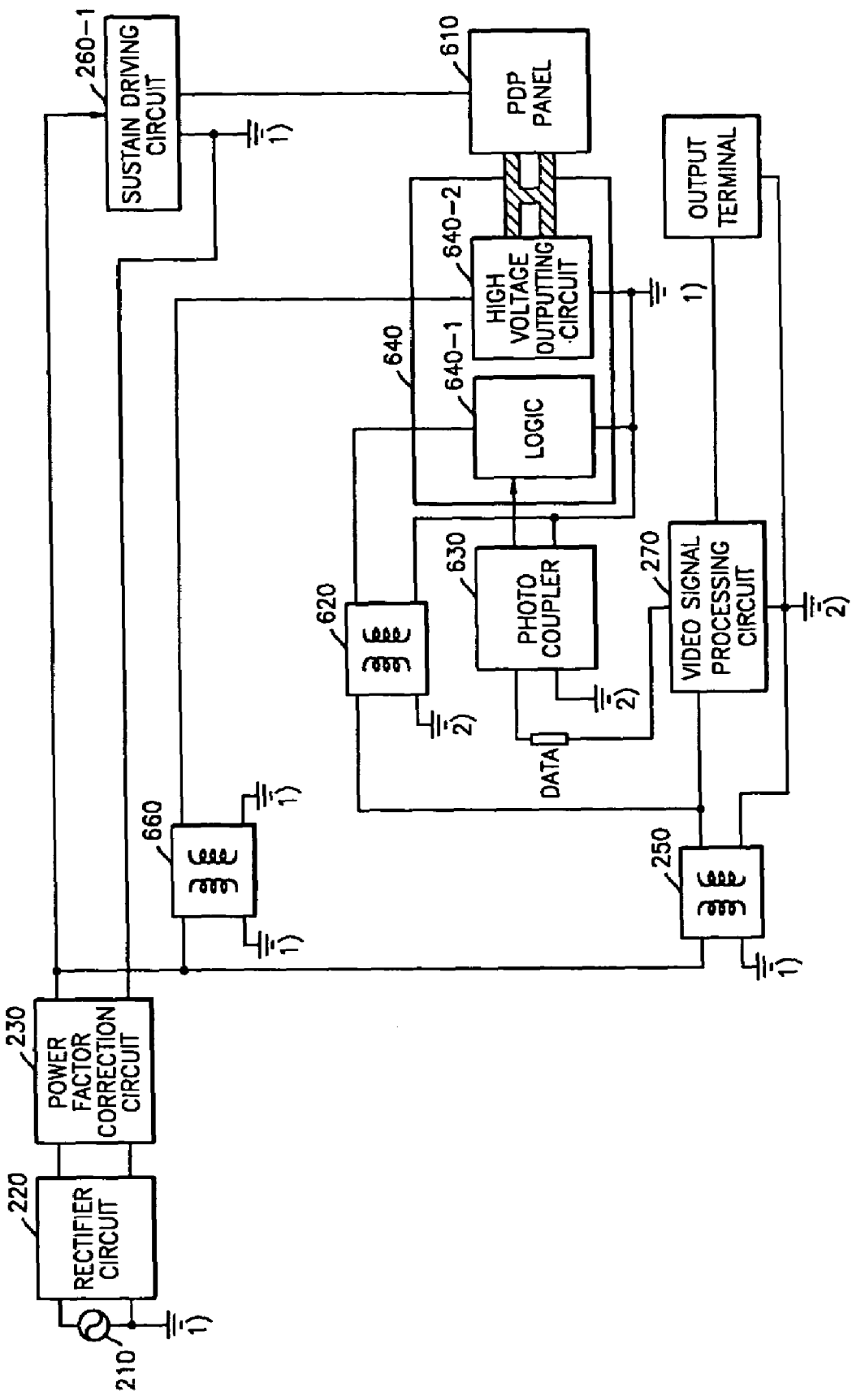
FIG. 6 is a view showing a ground system of a plasma display panel driving system according to another embodiment of the present invention.

FIG. 6 is a view showing a ground system to solve the isolation problem in the plasma display panel driving system applied by the present invention.

The video signal processing circuit 270 processes the input broadcasting signal or the video signal to generate the data used to drive the display panel, and the isolated DC power output from the DC-DC conversion circuit is used as the driving power of the video signal processing circuit 270.

In addition, the power of the video signal processing circuit 270 is isolated by the DC-DC conversion circuit 620 from a scan and address driving circuit 640 using high voltage, and a data line is isolated by a photocoupler 630.

In the AC plasma display panel driving system, voltages larger than 160V are applied alternatively in the sustain driving operation and a lamp voltage is applied in a resetting operation, and therefore, it is similar to that the address and the scan driver IC is operated in an electrically floated status. Thus, the DC-DC conversion circuit 620 and the photocoupler 630 are used to isolate the circuit.

Also, since a large current of nearly 100A flows through the sustain driving circuit 260-1 with high frequency, the ground potential around the display panel changes a lot so that a mis-operation may be generated on a ground of the video signal processing circuit 270.

Therefore, it is required that the plasma display panel driving circuit and the video signal processing circuit 270 are isolated by the DC-DC conversion circuit 620 and the photocoupler 630 for a stabilized operation.

Thus, a ground (first ground) of an output circuit of the non-isolated power factor correction circuit 230, a ground (first ground) of the sustain driving circuit 260-1, a ground (first ground) of an output circuit of the DC-DC conversion circuit 660, and a ground (first ground) of the scan and address driving circuit 640 are electrically connected together. In addition, a ground (second ground) of the output circuit of the DC-DC conversion circuit 250 and a ground (second ground) of the video signal processing circuit 270 are electrically connected together.

Next, the grounds are designed so that the first grounds and the second grounds are electrically blocked from each other.

Accordingly, the ground of the video signal processing circuit 270 is isolated from the ground of the AC power by the DC-DC conversion circuit 250, and isolated from the ground on the display panel driving circuit by the DC-DC conversion circuit 620 and the photocoupler 630. Thus, if a user touches a metal portion which is connected to the ground on the video signal processing circuit 270 and exposed outward, the user is not electrocuted, and the international electricity safety standard IEC60035 can be satisfied.

In addition, the plasma display panel 610 itself is in non-isolated status, however, since a special glass, which is a superior insulating material, is generally used as the plasma display panel, there is no problem about the non-isolated plasma display panel. However, outer cases for an exposed electrode portion of the plasma display panel and printed circuit board (PCB) mounted portion should be prepared.

Therefore, the above described three problems which may be generated according to the circuit configuration in which the output voltage of the non-isolated power factor correction circuit is transferred directly to the display panel driving circuit without passing through the DC-DC conversion circuit can be dealt with according to above method.

In an aspect of the present invention, the ripple filter 240 is inserted between the power factor correction circuit 230 and the display panel driving circuit 260, however, the ripple filter 240 may be omitted and the capacity of the output capacitor C1 of the power factor correction circuit can be increased to improve the low frequency ripple and the regulation features.

As described above, according to the present invention, the output voltage of the power factor correction circuit is directly applied to the display panel driving circuit or applied to the display panel driving circuit after being passed through the ripple filter without 2-stage serially configuring the power used in the display panel driving circuit. Thus, an electrical power efficiency can be improved, reliability of the circuit can be improved by simplifying the electrical circuits, and material costs can be lowered by reducing the number of semiconductor elements.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A high-efficiency power supply apparatus used with a driving system driving a display panel, comprising:
   a direct current power supplying circuit to improve a power factor by rectifying an alternating current power with reference to a first ground, and generating a first direct current power not isolated from the first ground of the alternating current power, and a second direct current power isolated from the first ground of the alternating current power and with reference to a second ground that is electrically blocked from the first ground;
   a display panel driving circuit to generate various driving signals to drive the display panel with the first non-isolated direct current power; and
   a video signal processing circuit to perform a predetermined video signal processing to generate data to drive the display panel with the second isolated direct current power.

2. The apparatus of claim 1, wherein the direct current power supplying circuit comprises:
   a rectifier circuit to rectify the AC power and to output the AC source as a direct current voltage;
   a power factor correction circuit to receive the output of the rectifier circuit, to improve the power factor, and to generate the first non-isolated direct current power which is not isolated from the first ground of the alternating current power; and
   a direct current-direct current conversion circuit to receive the first non-isolated DC power and to convert the received first non-isolated DC power into the second isolated direct current power having a predetermined level isolated from the first ground of the alternating current power and with reference to the second ground.

3. The apparatus of claim 2, wherein the power factor correction circuit includes a converter to control a level of the output voltage.

4. The apparatus of claim 3, wherein the converter includes a single ended primary inductance converter (SEPIC).

5. The apparatus of claim 2, wherein the direct current supplying circuit further comprises a ripple filter to filter a ripple by inputting the output of the power factor correction circuit.

6. The apparatus of claim 5, wherein the ripple filter includes a serial type switching ripple filter.

7. The apparatus of claim 1, wherein the display panel includes a plasma display panel.

8. The apparatus of claim 1, wherein the display panel driving circuit includes a sustain driving circuit of the plasma display panel.

9. The apparatus of claim 1, wherein the data generated by the video signal processing circuit is transferred to the display panel driving circuit through a photocoupler.

10. The apparatus of claim 1, wherein an output end ground of a circuit generating the first non-isolated direct current power with reference to the first ground in the direct current power supplying circuit and a ground of the display panel driving circuit are connected to each other, an output end ground of a circuit generating the second isolated direct current power with reference to the second ground in the direct current power supplying circuit and a ground of the video signal processing circuit are connected to each other.

11. A method of designing a high-efficiency power supply apparatus used with a display panel driving system of a display panel, the method comprising:
providing a first non-isolated direct current power with reference to a first ground, which is not isolated from a ground of an input alternating current power directly to a display panel driving circuit; and
providing a second isolated direct current power with reference to a second ground, which is isolated from the first ground of the input alternating current power, to a video signal processing circuit which performs a pre-determined video signal process to generate data used to drive a display panel,
wherein the first and second grounds are electrically blocked from each other to isolate the display panel driving circuit and the video signal processing circuit.

12. The method of claim 11, wherein a ground of a circuit that generates the first non-isolated direct current power in a direct current power supplying circuit and a ground of the display panel driving circuit are connected to each other, a ground of a circuit that generates the second isolated direct current power in the direct current power supplying circuit and a ground of the video signal processing circuit are connected to each other.

13. The method of claim 11, wherein the first non-isolated direct current power is an output power of a power factor correction circuit.

14. The method of claim 11, wherein the first non-isolated direct current power is an output power passed through the power factor correction circuit and a ripple filter.

15. The method of claim 11, wherein the data generated by the video signal processing circuit is transferred to the display panel driving circuit through a photocoupler.

16. The method of claim 11, wherein the display panel includes a plasma display panel.

17. The method of claim 11, wherein the display panel driving circuit includes a sustain driving circuit of the plasma display panel.

18. A display panel driving system having a video signal processing circuit and a display panel driving circuit to drive a display panel, the system comprising:
a power supply unit to generate a first power with reference to a first ground potential and to provide the first power to the display panel driving circuit, and to generate a second power with reference to a second ground potential and to provide the second power to the video signal processing circuit, wherein the first ground potential is electrically isolated from the second ground potential so that the display panel driving circuit is isolated from the video signal processing circuit.

19. The system of claim 18, wherein the display panel driving circuit comprises a sustain driving circuit connected to the first ground potential, and the video signal processing circuit is connected to the second ground potential.

20. The system of claim 18, further comprising:
a DC-DC conversion circuit coupled between the power supply unit and the video signal processing circuit, wherein the power supply unit comprises a circuit receiving an AC power and outputting a DC power, and the DC power is transmitted to the video signal processing circuit through the DC-DC conversion circuit and directly to the display panel driving circuit without passing through the DC-DC conversion circuit.

21. The system of claim 20, wherein the display panel driving circuit and the DC-DC conversion circuit are connected to the first ground potential, and the video signal processing circuit is connected to the second ground potential.

22. The system of claim 21, further comprising:
a high voltage outputting circuit supplying a high voltage to the display panel and connected to the first ground potential; and
a second DC-DC conversion circuit connected between the high voltage outputting circuit having first and second coils connected to the first ground potential.

23. The system of claim 21, further comprising:
a photocoupler coupled between the video signal processing circuit and the display panel driving circuit and connected to the second ground potential.

24. The system of claim 23, further comprising:
a logic circuit coupled to the photocoupler to transmit data generated from the video processing circuit to the display panel driving circuit; and
a converter coupled between the logic and the DC-DC conversion circuit, and coupled to the second ground potential.

25. The system of claim 18, wherein the display panel is a plasma display panel (PDP) receiving data from the video signal processing circuit and a driving signal from the display panel driving circuit according to the data, and the system does not have a DC-DC conversion circuit connected between the power supply unit and the display panel driving circuit so that the first power is supplied directly to the display panel driving circuit while maintaining a common ground potential with an input AC power supply.

26. A method of driving a display panel in a display panel driving system having a video signal processing circuit and a display panel driving circuit, the method comprising:
generating a first direct current power with reference to a first ground potential not isolated from an input alternating current power and a second direct current power with reference to a second ground potential isolated from the input alternating current power; and
supplying the first direct current power to the display panel driving circuit and the second direct current power to the video signal processing circuit.

27. The method of claim 26, further comprising: isolating the display panel driving circuit from the video signal processing circuit.

* * * * *